United States Patent
Zhang et al.

(10) Patent No.: US 12,043,544 B2
(45) Date of Patent: Jul. 23, 2024

(54) FLEXIBLE BORON NITRIDE NANORIBBON AEROGEL AND PREPARATION METHOD THEREOF

(71) Applicant: SUZHOU INSTITUTE OF NANO-TECH AND NANO-BIONICS (SINANO), CHINESE ACADEMY OF SCIENCES, Suzhou (CN)

(72) Inventors: Xuetong Zhang, Suzhou (CN); Guangyong Li, Suzhou (CN)

(73) Assignee: SUZHOU INSTITUTE OF NANO-TECH AND NANO-BIONICS (SINANO), CHINESE ACADEMY OF SCIENCES, Suzhou (CN)

( * ) Notice: Subject to any disclaimer, the term of this patent is extended or adjusted under 35 U.S.C. 154(b) by 650 days.

(21) Appl. No.: 17/277,733

(22) PCT Filed: Jan. 2, 2020

(86) PCT No.: PCT/CN2020/070013
§ 371 (c)(1),
(2) Date: Mar. 19, 2021

(87) PCT Pub. No.: WO2020/168838
PCT Pub. Date: Aug. 27, 2020

(65) Prior Publication Data
US 2021/0354986 A1  Nov. 18, 2021

(30) Foreign Application Priority Data
Feb. 22, 2019 (CN) .......................... 201910132438.8

(51) Int. Cl.
*C01B 21/064* (2006.01)
*B01J 13/00* (2006.01)
(Continued)

(52) U.S. Cl.
CPC ....... *C01B 21/0646* (2013.01); *B01J 13/0065* (2013.01); *B01J 13/0091* (2013.01);
(Continued)

(58) Field of Classification Search
None
See application file for complete search history.

(56) References Cited

U.S. PATENT DOCUMENTS

| 2011/0045223 | A1  | 2/2011 | Nasa |
| 2015/0004087 | A1* | 1/2015 | Zettl ................... C01B 21/0645 423/290 |

FOREIGN PATENT DOCUMENTS

| CN | 104528671 A * | 4/2015 |
| CN | 104528671 A   | 4/2015 |

(Continued)

OTHER PUBLICATIONS

Lin, J., et al. "Self-Assembly of Porous Boron Nitride Microfibers into Ultralight Multifunctional Foams of Large Sizes." ACS Appl. Mater. Interfaces 2017, 9, 51, 44732-44739 (Year: 2017).*

(Continued)

*Primary Examiner* — Anthony J Zimmer
*Assistant Examiner* — Zachary John Baum
(74) *Attorney, Agent, or Firm* — Bayramoglu Law Offices LLC

(57) ABSTRACT

A flexible boron nitride nanoribbon aerogel has an interconnected three-dimensional porous network structure which is formed by mutually twining and contacting boron nitride nanoribbons and consists of macropores having a pore diameter of more than 50 nm, mesopores having a pore diameter of 2-50 nm and micropores having a pore diameter of less than 2 nm. The preparation method of the flexible boron nitride nanoribbon aerogel includes the following steps: performing high-temperature dissolution on boric acid (Continued)

and a nitrogen-containing precursor to form a transparent precursor solution, preparing the transparent precursor solution into precursor hydrogel, subsequently drying and performing high-temperature pyrolysis to obtain the flexible boron nitride nanoribbon aerogel. The boron nitride nanoribbon aerogel has excellent flexibility and resilience and can withstand different forms of loads from the outside within a wide temperature range.

14 Claims, 15 Drawing Sheets

(52) U.S. Cl.
CPC ...... *C01P 2004/03* (2013.01); *C01P 2004/04* (2013.01); *C01P 2004/24* (2013.01); *C01P 2006/10* (2013.01); *C01P 2006/12* (2013.01); *C01P 2006/14* (2013.01); *C01P 2006/17* (2013.01); *C01P 2006/32* (2013.01); *C01P 2006/90* (2013.01)

(56) References Cited

FOREIGN PATENT DOCUMENTS

| | | | |
|---|---|---|---|
| CN | 104803362 | A | 7/2015 |
| CN | 106495109 | A * | 3/2017 |
| CN | 106495109 | A | 3/2017 |
| CN | 106865509 | A | 6/2017 |
| CN | 107161960 | A | 9/2017 |
| CN | 107793174 | A | 3/2018 |
| CN | 108584891 | A * | 9/2018 |
| CN | 108584891 | A | 9/2018 |
| CN | 109704296 | A | 5/2019 |
| WO | 2020167442 | A1 | 8/2020 |

OTHER PUBLICATIONS

Cheng, F., et al. Controlled growth of 1D MoSe2 nanoribbons with spatially modulated edge states. Nano Lett. 2017, 17, 1116-1120. (Year: 2017).*

Lin, J. et al. Self-assembly of porous boron nitride microfibers into ultralight multifunctional foams of large sizes. ACS Appl. Mater. Interfaces 2017, 9, 51, 44732-44739, Annotated. (Year: 2017).*

English translation of CN-108584891-A Description (Year: 2018).*

English translation of CN-106495109-A Description (Year: 2017).*

English translation of CN-104528671-A Description (Year: 2015).*

Tao Liu, et al., Porous boron nitride nanoribbons with large width as superior adsorbents for rapid removal of cadmium and copper ions from water; New J. Chem., 2019, pp. 3280-3290, vol. 43.

Xiaoliang Zeng, et al., Facile Preparation of Superelastic and Ultralow Dielectric Boron Nitride Nanosheet Aerogels via Freeze-Casting Process, Chem. Mater., 2015, pp. 5849-5855, vol. 27.

* cited by examiner

FLEXIBLE BORON NITRIDE NANORIBBON AEROGEL AND PREPARATION METHOD THEREOF

CROSS REFERENCE TO THE RELATED APPLICATIONS

This application is the national phase entry of International Application No. PCT/CN2020/070013, filed on Jan. 2, 2020, which is based upon and claims priority to Chinese Patent Application No. 201910132438.8, filed on Feb. 22, 2019, the entire contents of which are incorporated herein by reference.

TECHNICAL FIELD

The present application relates to a flexible boron nitride nanoribbon aerogel and a preparation method thereof, belonging to the technical field of nano energy.

BACKGROUND

Aerogel is a low-density solid material having a gas dispersion medium and a continuous three-dimensional porous network structure. Since American chemist Samuel Stephens Kistler prepared "solid smoke"-silica aerogel with a supercritical fluid drying technology in 1932 for the first time, the aerogel, as a new member of a material family, has attracted much attention and research. With the development over the past century, a series of aerogels with different materials, structures and properties have been synthesized in turn, for example, alkoxy silane derived silica aerogels, metal oxide aerogels ($TiO_2$, $Al_2O_3$, $ZrO_2$, etc.), metal simple substance aerogels (such as gold), polymer aerogels (polyaniline, polypyrrole, polyimide, etc.), carbon aerogels, new nano carbon aerogels (graphene, carbon nanotubes, etc.), semiconductor sulfide aerogels, carbide aerogels (silicon carbide, aluminum carbide, etc.), natural polymer aerogels (namely cellulose and other polysaccharides and various proteins) and boron nitride aerogel, which greatly enrich the aerogel family, and expand the research fields and application direction of aerogels.

The aerogel generally forms a disordered and continuous colloid network in a solution through a sol-gel method, subsequently the solution component in the gel network is removed using a special drying process (such as supercritical fluid drying) meanwhile maintaining the gel network is not broken, and then a light solid material having a disordered and nano-scale continuous porous network. As people continuously have made researches on aerogels, the knowledge of aerogels has been enriched. To prepare aerogel materials which can be applied to different scenes and have different components and structures, a series of components, gel preparation methods and drying methods are introduced into preparation of aerogels. For example, component control: developed from a single component aerogel to a multi-component aerogel, from a single network aerogel to a multi-network aerogel; gel preparation method: developed from an original single sol-gel network to a gel network obtained through three dimensional assembly (self-assembly, freezing crystallization induced assembly) of various structural units. The drying manner, as an important link, has drawn attention from people, which is developed from an early supercritical drying method to an ambient drying method in a freeze drying machine and other drying methods, and a series of aerogels having hyperelasticity are prepared, thereby significantly expanding the variety, property and application of aerogels. However, the mechanical properties of current aerogels still have huge defects, and their brittleness and weak mechanical strength and flexibility are limited, especially the flexibility maintenance within a wide temperature range is poor, which all restrict application fields of aerogels.

The boron nitride aerogel has excellent thermal stability and have important applications in the fields of thermal management, environment, electronic packaging, gas storage and the like. At present, the main methods for preparing the boron nitride aerogel are a chemical vapor deposition template method, a modified boron nitride nanosheet self-assembly method and a small molecule precursor method. However, the chemical vapor deposition template method involves a series of complex vapor phase, high temperature and high/low pressure environments, is harsh in preparation process and difficult to be used for large-scale preparation, and does not easily control flexibility, porosity and other properties. In the boron nitride nanosheet self-assembly method, boron nitride nanosheets are low in yield and nearly have no sol-gel chemical features, and it is needed to prepare the boron nitride aerogel under the help of a foreign polymer cross-linking agent. However, due to the introduction of the polymer cross-linking agent, the thermal stability of the prepared boron nitride aerogel decreases rapidly, and excellent mechanical properties at high temperature cannot be maintained. The boron nitride aerogel prepared by the small molecular precursor method has a series of problems, such as weak mechanical strength and brittleness. Therefore, the preparation of the flexible boron nitride aerogel is still a problem.

In view of excellent mechanical property, good flexibility and a requirement for aerogels whose temperature change influence can be neglected, it is urgent to need and put forward an aerogel material with a novel structure and properties and a preparation method thereof, so as to achieve the purposes of simple process, short cycle and low cost, thereby giving full play to the advantages of aerogel materials, and pushing the application of aerogels to a new height and then meeting the needs of social development on multifunctional integrated new materials.

SUMMARY

The main object of the present application is to provide a flexible boron nitride nanoribbon aerogel and a preparation method thereof to overcome the defects in the prior art.

In order to achieve the above object, the technical solution adopted by the present application is as follows:

The embodiment of the present application provides a flexible boron nitride nanoribbon aerogel, comprising an interconnected three-dimensional porous network structure which is formed by mutually twining and contacting boron nitride nanoribbons and consists of macropores having a pore diameter of more than 50 nm, mesopores having a pore diameter of 2-50 nm and micropores having a pore diameter of less than 2 nm.

In some preferred embodiments, the macropores are formed by contacting the boron nitride nanoribbons, and the boron nitride nanoribbon has the mesopores and the micropores; and/or the boron nitride nanoribbon is in a straight, twisted or bent state in the three-dimensional porous network structure.

The embodiment of the present application also provides a preparation method of a flexible boron nitride nanoribbon aerogel, comprising:

1) dissolving boric acid and a nitrogen-containing precursor into a solvent to obtain a transparent precursor solution;
2) cooling the precursor solution to obtain a precursor hydrogel;
3) drying the precursor hydrogel to obtain a precursor aerogel; and
4) performing high-temperature hydrolysis on the precursor aerogel at a protective atmosphere to obtain a flexible boron nitride nanoribbon aerogel.

The embodiment of the present application also provides the flexible boron nitride nanoribbon aerogel prepared by the above preparation method.

Compared with the prior art, the present application at least has the advantages:

1) the basic structure unit of the boron nitride nanoribbon aerogel of the present application is the boric nitride nanoribbon, and the boron nitride nanoribbon aerogel has a continuous three-dimensional porous network structure which is formed by twining and contacting boron nitride nanoribbons, and is flexible;
2) the flexible boron nitride nanoribbon aerogel provided by the present application exhibits good flexibility within a range of −196° C.-1000° C., can withstand loads such as compression, shearing, twisting and bending, and has good resilience;
3) the flexible boron nitride nanoribbon aerogel provided by the present application is obtained by realizing sol-gel in the solvent with boric acid and a nitrogen-containing small molecule as precursor raw materials, drying and performing high-temperature hydrolysis;
4) the preparation process of the flexible boron nitride nanoribbon aerogel provided by the present application is concise, mild in reaction conditions, easy to operate, low in energy consumption, low in cost, green and free of pollution, and can be used for realizing large-scale continuous production.

BRIEF DESCRIPTION OF THE DRAWINGS

For a better illustrating of the embodiments of the present application or the technical solution in the prior art, embodiments or drawings used in the prior art will be simply described below. Obviously, the drawings in the description are only some examples in the present application, persons of ordinary skill in the art can obtain other drawings according to these drawings without creative efforts.

DETAILED DESCRIPTION OF THE EMBODIMENTS

Figure 1:
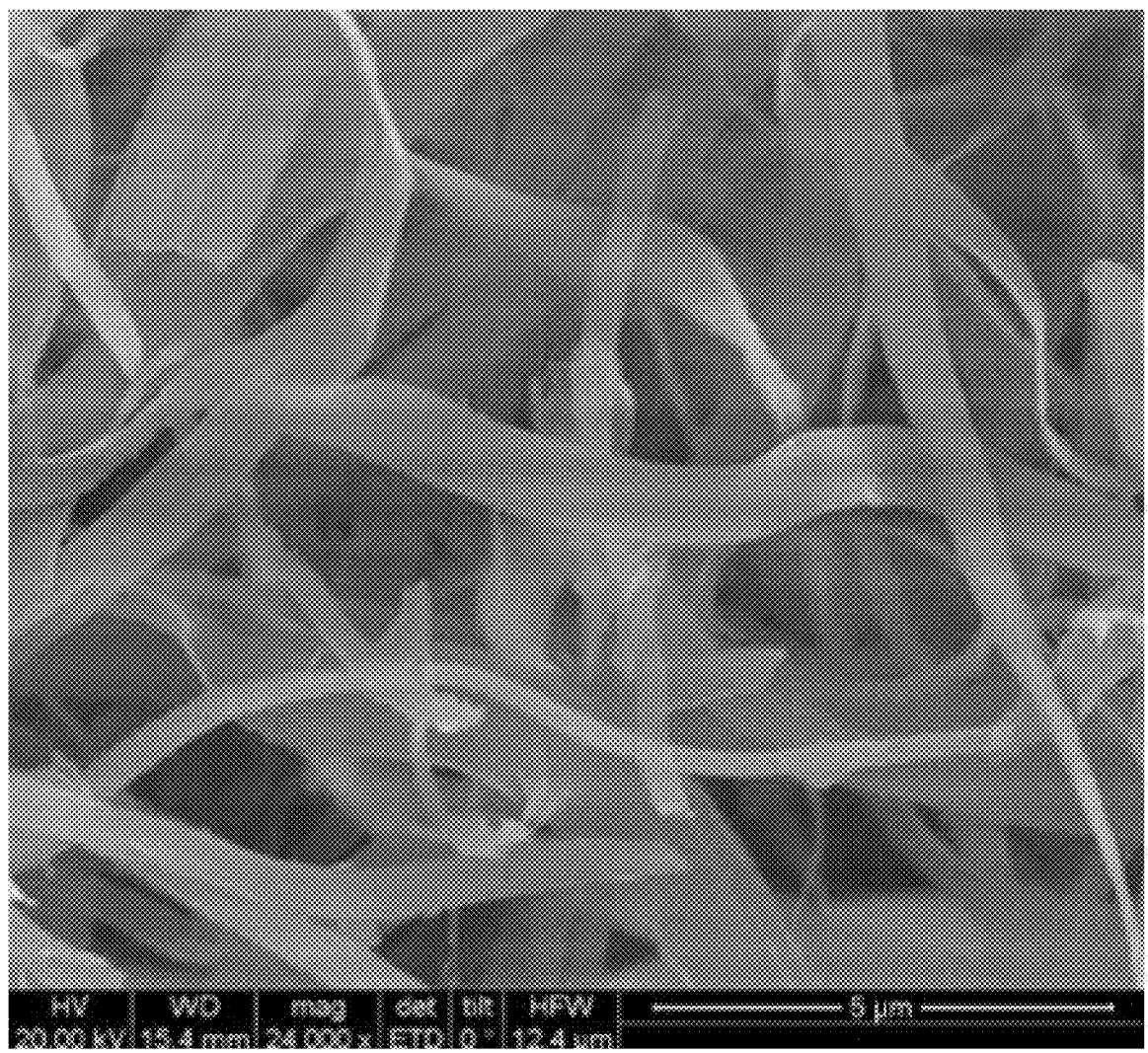
FIG. 1 is a scanning electron microscope (SEM) image of a boron nitride nanoribbon aerogel obtained in example 1 of the present application.

In view of the defects in the prior art, the present inventors proposed the technical solution of the present application via long-term researches and lots of practices. The present application firstly provides a flexible boron nitride nanoribbon aerogel and a preparation method thereof.

One aspect of the embodiment of the present application provides a flexible boron nitride nanoribbon aerogel. The basic structure unit of the nitride nanoribbon aerogel is a nitride nanoribbon which has an interconnected three-dimensional porous network structure which is formed by mutually twining and contacting boron nitride nanoribbons and consists of macropores having a pore diameter of more than 50 nm, mesopores having a pore diameter of 2-50 nm and micropores having a pore diameter of less than 2 nm.

In some preferred embodiments, the macropores are formed by intercontacting the boron nitride nanoribbons, and the boron nitride nanoribbon itself has the mesopores and the micropores.

In some preferred embodiments, the boron nitride nanoribbon is in a straight, twisted or bent state in the three-dimensional porous network structure.

In some preferred embodiments, the boron nitride nanoribbon is mainly composed of boron and nitrogen elements and contains trace carbon and oxygen elements.

Further, the boron nitride nanoribbon contains boron, nitrogen, carbon and oxygen elements.

Further, the boron nitride nanoribbon has a thickness of 1 nm-10 μm, preferably 1 nm-100 nm.

Further, the boron nitride nanoribbon has a width of 10 nm-50 μm, preferably 100 nm-10 μm.

Further, the boron nitride nanoribbon has a length of 100 nm-10 mm, preferably 1 μm-800 μm.

In some preferred embodiments, the flexible boron nitride nanoribbon aerogel has a density can be adjusted between 1 mg/mL and 600 mg/mL, preferably 5-100 mg/mL.

Further, the flexible boron nitride nanoribbon aerogel exhibits hydrophobic property, a contact angle between the surface of the flexible boron nitride nanoribbon aerogel and water is 60-170°, preferably 120-150°.

Further, the flexible boron nitride nanoribbon aerogel has a thermal conductivity of 0.025-0.5 W/mK, preferably 0.025-0.2 W/mK, especially preferably 0.03-0.05 W/mK.

Further, the flexible boron nitride nanoribbon aerogel has a specific surface area of 10-1800 $m^2/g$, preferably 500-1500 $m^2/g$, a pore volume of 0.1-2.0 $cm^3/g$, preferably 0.5-1.5 $cm^3/g$, and a porosity of 1-99%, preferably 75-97%.

Further, the flexible boron nitride nanoribbon aerogel has excellent flexibility and resilience. The boron nitride nanoribbon aerogel can withstand different forms of loads from the outside such as external compression, bending, twisting and shearing, and the boron nitride nanoribbon aerogel is not broken and has excellent anti-shearing property. When the loads are removed, the boron nitride nanoribbon aerogel can be restored to the original shape, and has excellent shape restoration performance.

Further, the flexible boron nitride nanoribbon aerogel maintains good flexibility resilience within a wide temperature range, the wide temperature range is from liquid nitrogen environment (−196° C.) to high-temperature fame (up to 1000° C.).

Another aspect of the embodiment of the present application also provides a preparation method of a flexible boron nitride nanoribbon aerogel, mainly comprising: dissolving boric acid and a nitrogen-containing precursor at high temperature to obtain a transparent precursor solution, ultrasounding and cooling to obtain a precursor hydrogel, and subsequently performing specific drying and high-temperature pyrolysis to obtain a flexible boron nitride nanoribbon aerogel.

Specifically, a preparation method of a flexible boron nitride nanoribbon aerogel provided by the present application comprises:
1) dissolving boric acid and a nitrogen-containing precursor into a solvent to obtain a transparent precursor solution;
2) cooling the precursor solution to obtain a precursor hydrogel;
3) drying the precursor hydrogel to obtain a precursor aerogel; and
4) performing high-temperature hydrolysis on the precursor aerogel at a protective atmosphere to obtain a flexible boron nitride nanoribbon aerogel.

In some preferred embodiments, the nitrogen-containing precursor in step 1) comprises a combination of any one or more than two of urea, melamine, cyanuric acid, biuret and dimethylguanidine, but is not limited thereto.

In some preferred embodiments, a molar ratio of the boric acid to the nitrogen-containing precursor is (1:50)-(50:1), preferably (1:10)-(10:1), more preferably (1:5)-(5:1).

Further, the solvent comprises a combination of any one or more than two of water, methanol, ethanol, ethylene glycol, n-propanol, isopropanol, n-butanol, isobutanol, sec-butanol, tert-butanol, acetone and dimethyl sulfoxide, but is not limited thereto.

Further, the dissolution temperature is 30-100° C., preferably 40-70° C.

In some preferred embodiments, in step 2), the cooling temperature is −196-65° C., preferably −50° C.-50° C., especially preferably −50° C.-40° C., and the cooling time is 5 min-12 h.

Further, the step 2) comprises: cooling is performed at an ultrasonic environment or an ultrasonic-free environment;

More further, the ultrasonic power is 0.01 W-10000 W, and the ultrasonic time is 0.5 min-12 h.

Further, the drying in step 3) comprises a combination of any one or more than two of freeze drying, ambient drying, vacuum drying and supercritical drying, but is not limited thereto.

Further, in step 4), the high-temperature hydrolysis temperature is 400-1800° C., preferably 800-1400° C., and the high-temperature hydrolysis time is 0.5-24 h, preferably 0.5-12 h, especially preferably 6-12 h.

Further, the protective atmosphere comprises a combination of any one or more than two of nitrogen, inert gas, ammonia, hydrogen and air atmospheres, but is not limited thereto.

In summary, the flexible boron nitride nanoribbon aerogel provided by the present application has a continuous three-dimensional porous network structure which is formed by twining and contacting boron nitride nanoribbons, is flexible within a wide temperature range, and its preparation process is concise, mild in reaction conditions, easy to operate, low in cost, green and free of pollution and can be used for realizing large-scale continuous production.

Next, the technical solution of the present application will be further described in detail through several examples in combination with drawings. However, selected examples are only for illustrating the present application but not limiting the scope of the present application.

Example 1

(a) 0.03 mol of boric acid and 0.003 mol of melamine were added into 100 mL of methanol solution and stirred in 65° C. water bath until the solution system was transparent.

(b) The transparent solution in step (a) was subjected to ultrasonic treatment for 30 min under the power of 0.1 W in a 5° C. environment to obtain white boric acid/melamine salt hydrogel.

(c) The white boric acid/melamine salt hydrogel in step (b) was placed in a freeze dryer to be freeze dried for 24 h to obtain boric acid/melamine salt aerogel.

(d) The boric acid/melamine aerogel in step (c) was subjected to high-temperature hydrolysis for 12 h at 600° C. in an argon/ammonia atmosphere to obtain the flexible boron nitride nanoribbon aerogel.

Figure 11:
FIG. 11 is a transmission electron microscope (TEM) image of a boron nitride nanoribbon aerogel obtained in example 1 of the present application.
Figure 12:
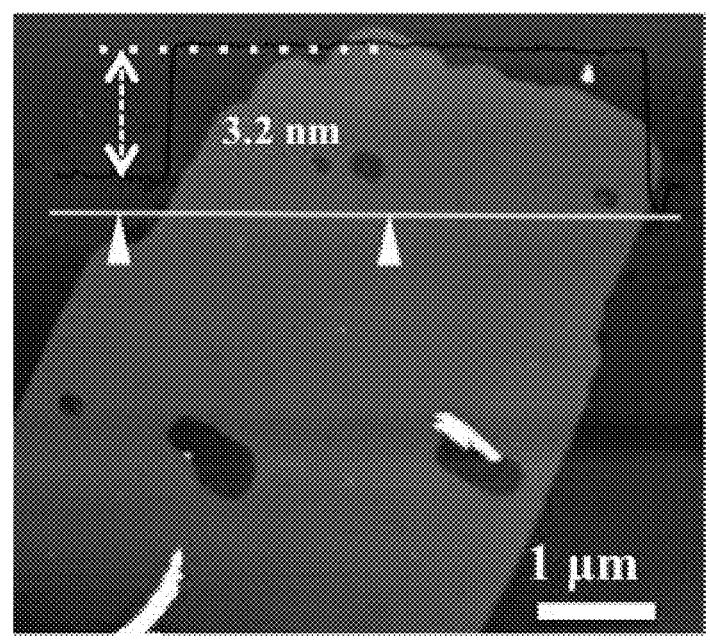
FIG. 12 is an atomic force microscope (AFM) image of a boron nitride nanoribbon aerogel obtained in example 1 of the present application.
Figure 13:
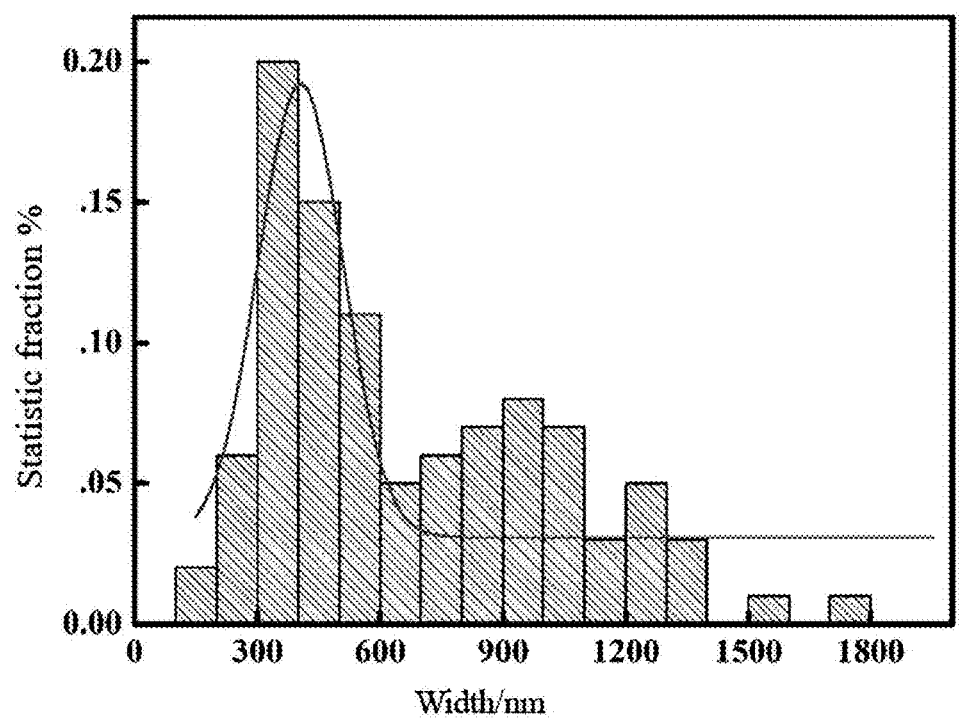
FIG. 13 is a width statistical graph of a boron nitrogen nanoribbon in a boron nitride nanoribbon aerogel obtained in example 1 of the present application.
Figure 14:
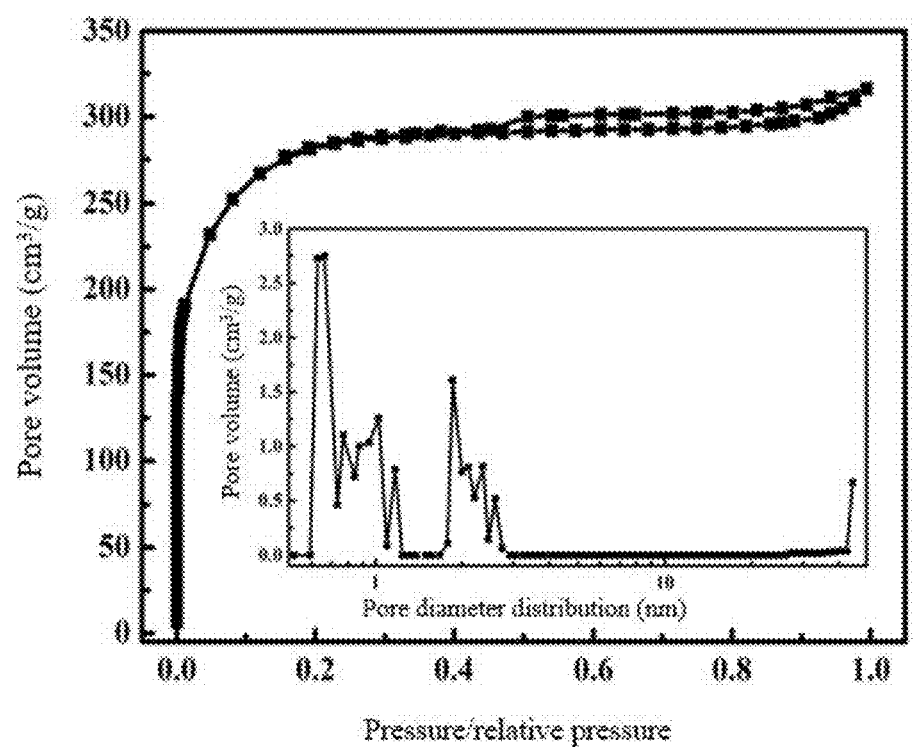
FIG. 14 is a nitrogen adsorption and desorption curve and a pore diameter distribution graph of a boron nitride nanoribbon aerogel obtained in example 1 of the present application.
Figure 15:
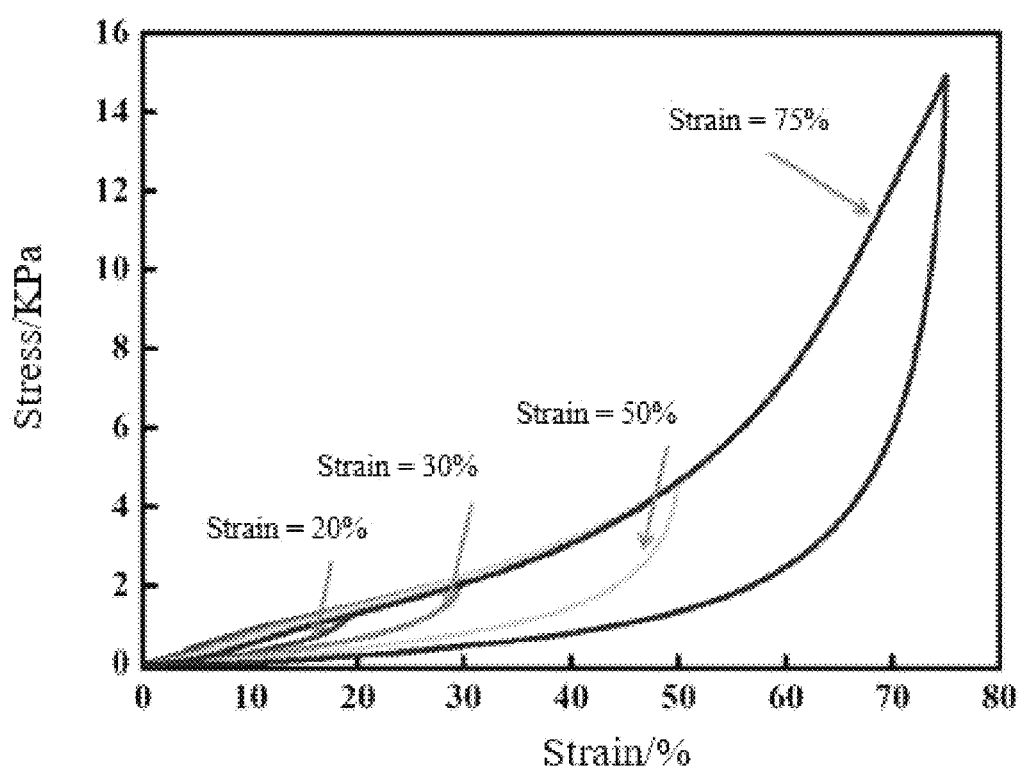
FIG. 15 is a stress-strain circular curve graph of a boron nitride nanoribbon aerogel obtained in example 1 of the present application.
Figure 16:
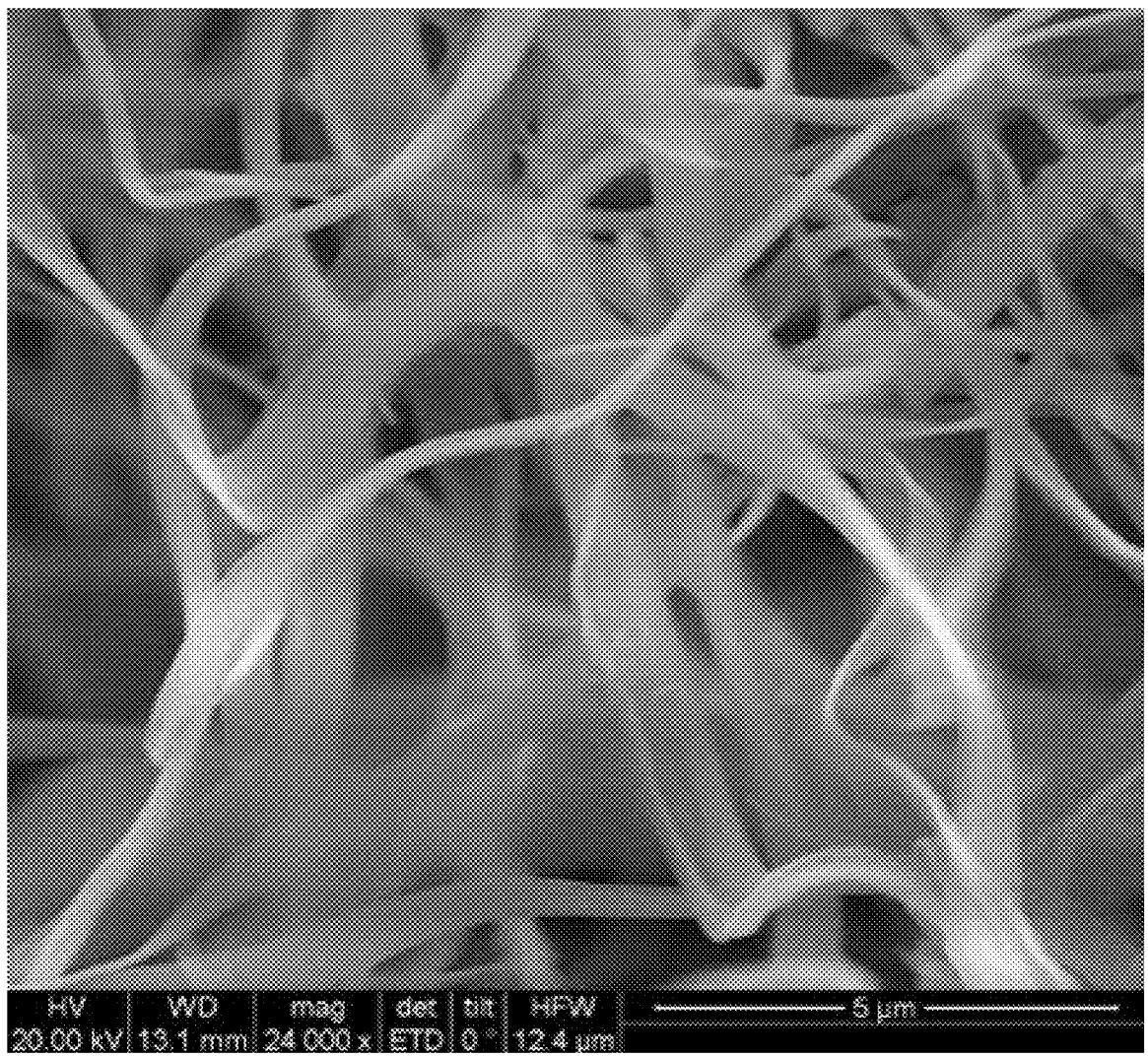
FIG. 16 is a scanning electron microscope (SEM) image of a boron nitride nanoribbon aerogel obtained in example 1 of the present application after liquid nitrogen treatment.
Figure 17:
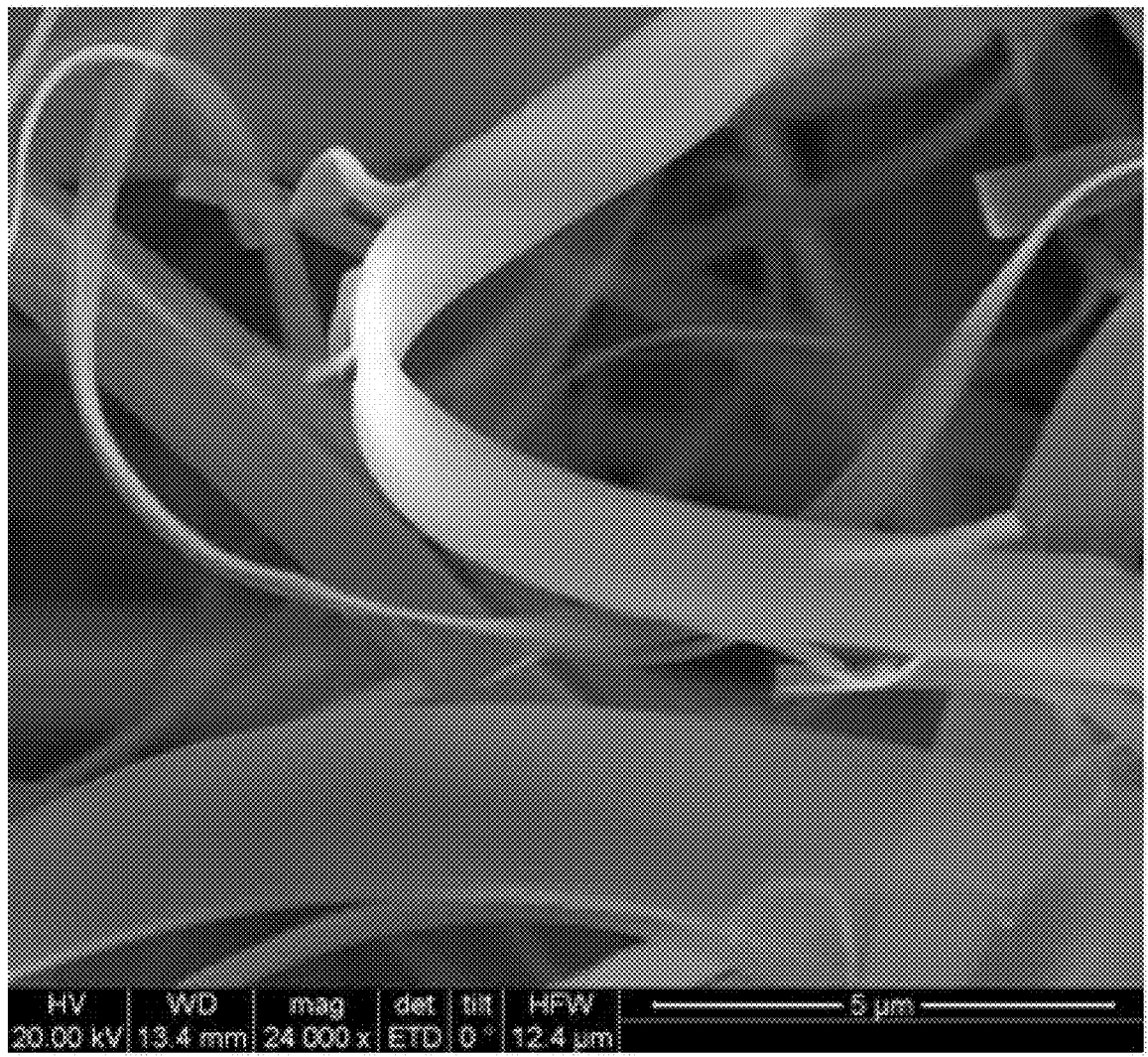
FIG. 17 is a scanning electron microscope (SEM) image of a boron nitride nanoribbon aerogel obtained in example 1 of the present application after flame treatment.

The structure and performance characterization data of the aerogel obtained in this example are as follows: via BET test, the boron nitride nanoribbon aerogel has a specific surface area of 980 $m^2/g$, a pore diameter distribution of 0.5-50 nm, and its SEM structure is shown in FIG. 1, its TEM image is shown in FIG. 11, and its AFM image is shown in FIG. 12. The width size distribution of the boron nitride nanoribbon is shown in FIG. 13, its nitrogen adsorption-desorption curves and pore diameter distribution are shown in FIG. 14, the compression stress-strain curve is shown in FIG. 15, the SEM of the aerogel treated with liquid nitrogen is shown in FIG. 16, and its SEM image of the aerogel after flame burning is shown in FIG. 17. The related physical properties of the aerogel obtained in this example are shown in Table 1.

Example 2

(a) 0.15 mol of boric acid and 0.45 mol of melamine were added into 175 mL of water/ethanol mixed solution (a volume ratio of water to ethanol was 10:1) and stirred in 90° C. water bath until the solution system was transparent.

(b) The transparent solution in step (a) was subjected to ultrasonic treatment for 10 h under the power of 10000 W in a 55° C. environment to obtain white boric acid/melamine salt hydrogel.

(c) The white boric acid/melamine salt hydrogel in step (b) was placed in 65° C. oven and subjected to standing and drying for 24 h to obtain boric acid/melamine salt aerogel.

(d) The boric acid/melamine aerogel in step (c) was subjected to high-temperature hydrolysis for 24 h at 1500° C. in a nitrogen atmosphere to obtain the flexible boron nitride nanoribbon aerogel.

Figure 2:
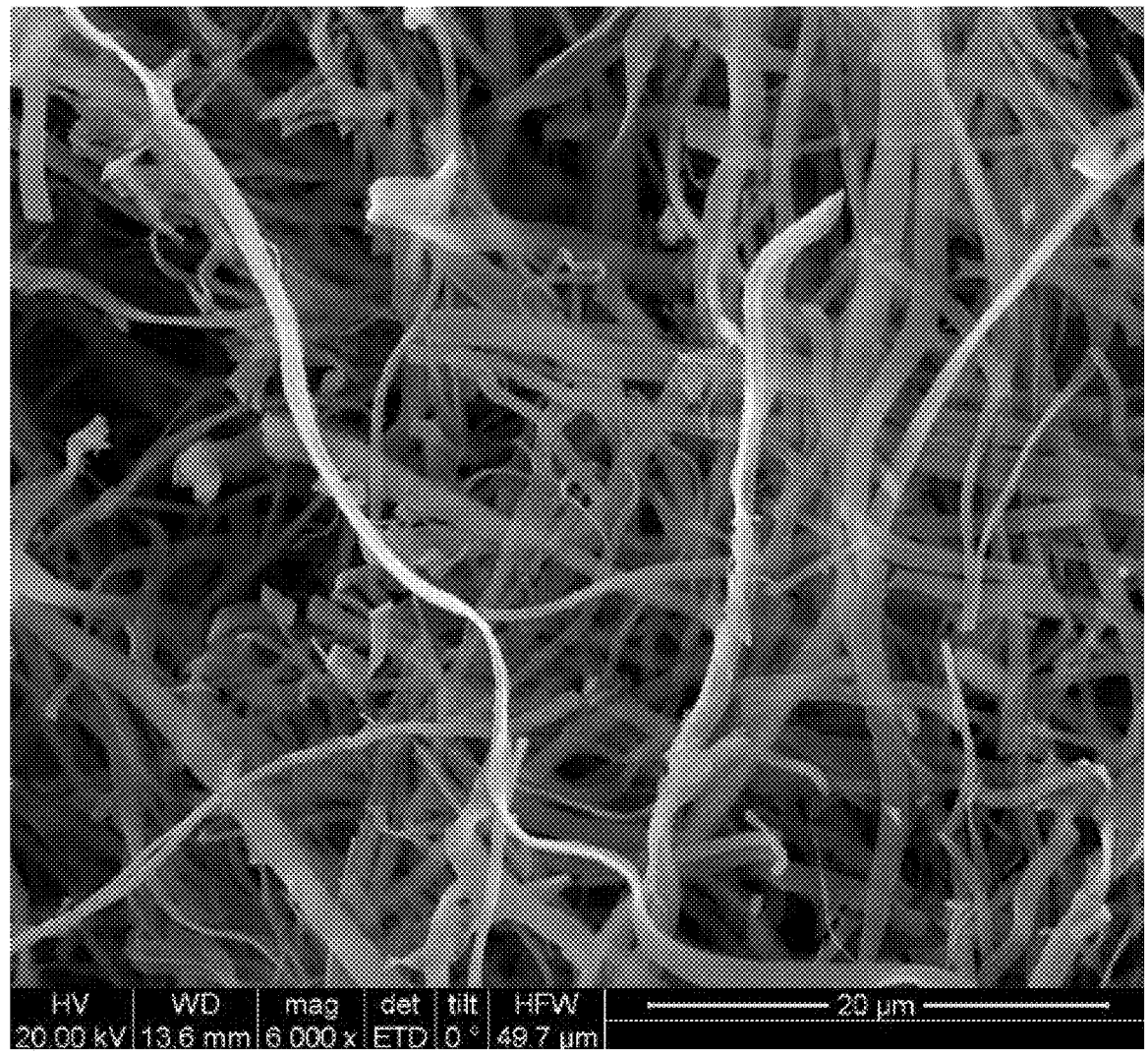
FIG. 2 is a scanning electron microscope (SEM) image of a boron nitride nanoribbon aerogel obtained in example 2 of the present application.

The SEM image of the boron nitride nanoribbon aerogel obtained in this example is shown in FIG. 2, and related physical property parameters are seen in Table 1.

Example 3

(a) 0.01 g of boric acid, 0.01 g of melamine and 0.5 g of urea were added into 120 mL of ethanol/tert-butanol mixed solution (a volume ratio of ethanol to tert-butanol was 5:3) and stirred in 40° C. water bath until the solution system was transparent.

(b) The transparent solution in step (a) was subjected to ultrasonic treatment for 5 min under the power of 100 W in a 15° C. environment to obtain white boric acid/melamine-urea salt hydrogel.

(c) The white boric acid/melamine-urea salt hydrogel in step (b) was placed in a freeze dryer to be freeze dried for 12 h to obtain boric acid/melamine-urea salt aerogel.

(d) The boric acid/melamine-urea salt aerogel in step (c) was subjected to high-temperature hydrolysis for 6 h at 1300° C. in an argon atmosphere to obtain the flexible boron nitride nanoribbon aerogel.

Figure 3:
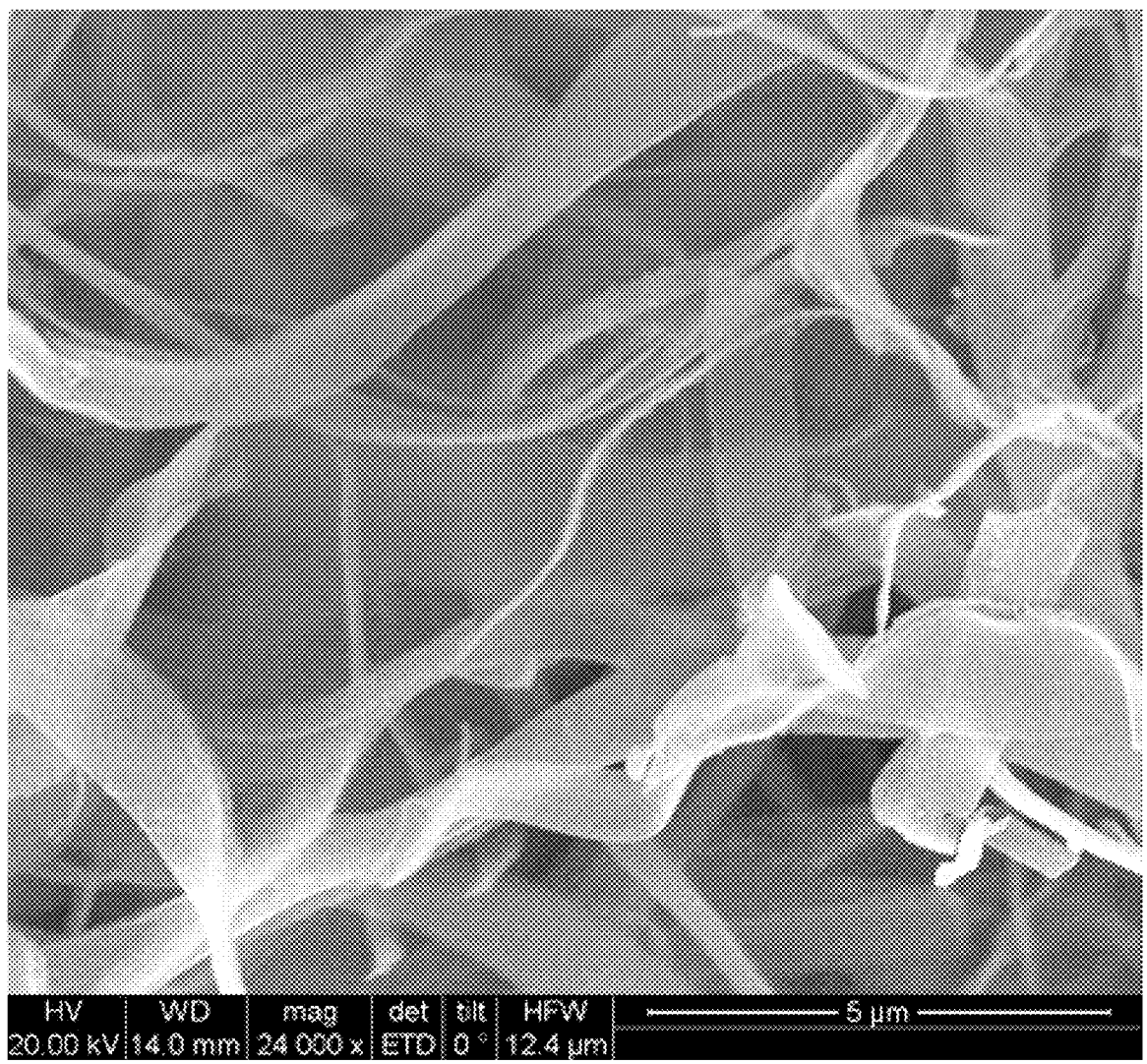
FIG. 3 is a scanning electron microscope (SEM) image of a boron nitride nanoribbon aerogel obtained in example 3 of the present application.

The SEM image of the boron nitride nanoribbon aerogel obtained in this example is shown in FIG. 3, and related physical property parameters are seen in Table 1.

Example 4

(a) 0.001 mol of boric acid and 0.01 mol of melamine were added into 120 mL of ethanol/isopropanol mixed solution (a volume ratio of ethanol to isopropanol was 1:5) and stirred in 85° C. water bath until the solution system was transparent.

(b) The transparent solution in step (a) was subjected to ultrasonic treatment for 12 h under the power of 0.01 W in a −15° C. environment to obtain white boric acid/melamine salt hydrogel.

(c) The white boric acid/melamine salt hydrogel in step (b) was placed in a freeze dryer to be freeze dried for 48 h to obtain boric acid/melamine salt aerogel.

(d) The boric acid/melamine salt aerogel in step (c) was subjected to high-temperature hydrolysis for 3 h at 1800° C. in a hydrogen atmosphere to obtain the flexible boron nitride nanoribbon aerogel.

Figure 4:
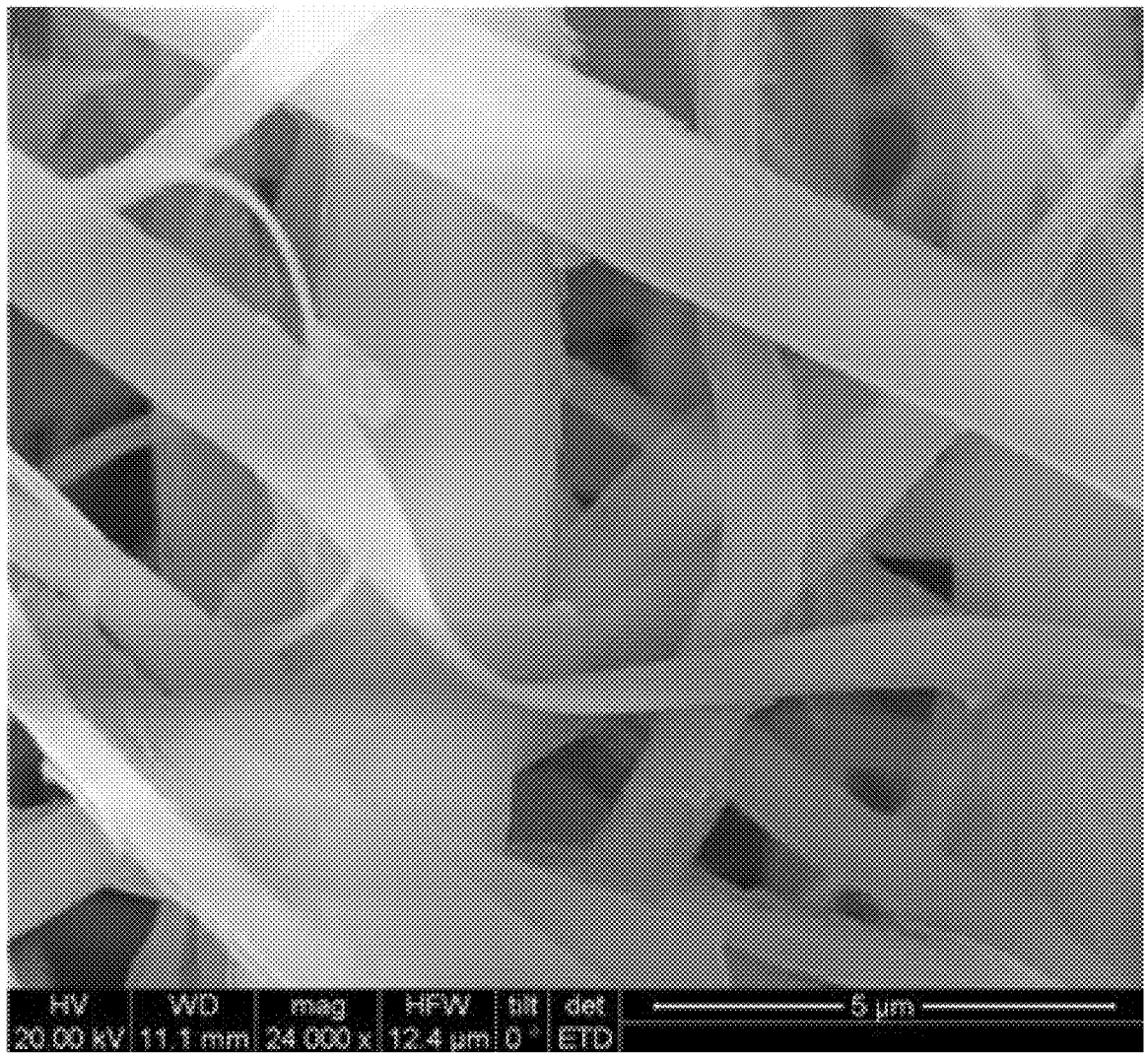
FIG. 4 is a scanning electron microscope (SEM) image of a boron nitride nanoribbon aerogel obtained in example 4 of the present application.

The SEM image of the boron nitride nanoribbon aerogel obtained in this example is shown in FIG. 4, and related physical property parameters are seen in Table 1.

Example 5

(a) 0.003 mol of boric acid, 0.001 mol of melamine and 0.01 mol of biuret were added into 300 mL, of aqueous solution and stirred in 95° C. water bath until the solution system was transparent.

(b) The transparent solution in step (a) was subjected to standing for 6 h in 50° C. environment to obtain white boric acid/melamine/biuret salt hydrogel.

(c) The white boric acid/melamine/biuret salt hydrogel in step (b) was placed in a freeze dryer to be freeze dried for 48 h to obtain boric acid/melamine/biuret salt aerogel.

(d) The boric acid/melamine/biuret salt aerogel in step (c) was subjected to high-temperature hydrolysis for 12 h at 1400° C. in a nitrogen atmosphere to obtain the flexible boron nitride nanoribbon aerogel.

Figure 5:
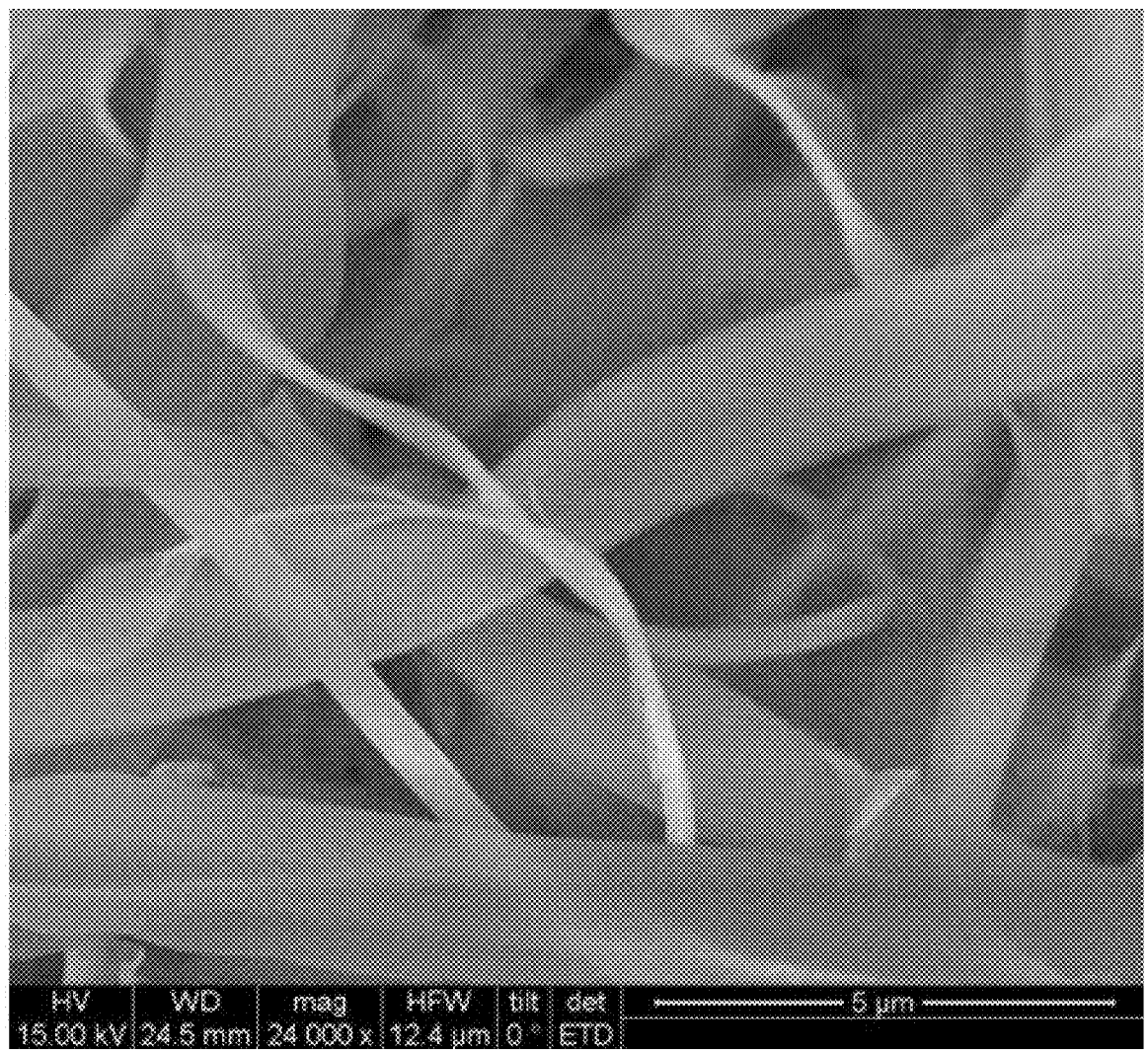
FIG. 5 is a scanning electron microscope (SEM) image of a boron nitride nanoribbon aerogel obtained in example 5 of the present application.

The SEM image of the boron nitride nanoribbon aerogel obtained in this example is shown in FIG. 5, and related physical property parameters are seen in Table 1.

Example 6

(a) 0.05 mol of boric acid and 0.25 mol of melamine were added into 200 mL of ethanol/n-propanol mixed solution (a volume ratio of ethanol to n-propanol was 10:1) and stirred in 85° C. water bath until the solution system was transparent.

(b) The transparent solution in step (a) was subjected to ultrasonic treatment for 5 min under the power of 10 W in a liquid nitrogen environment to obtain white boric acid/melamine salt hydrogel.

(c) The white boric acid/melamine salt hydrogel in step (b) was placed in a vacuum oven and subjected to standing for 24 h at 60° C. to obtain boric acid/melamine salt aerogel.

(d) The boric acid/melamine salt aerogel in step (c) was subjected to high-temperature hydrolysis for 12 h at 1600° C. in an air atmosphere to obtain the flexible boron nitride nanoribbon aerogel.

Figure 6:
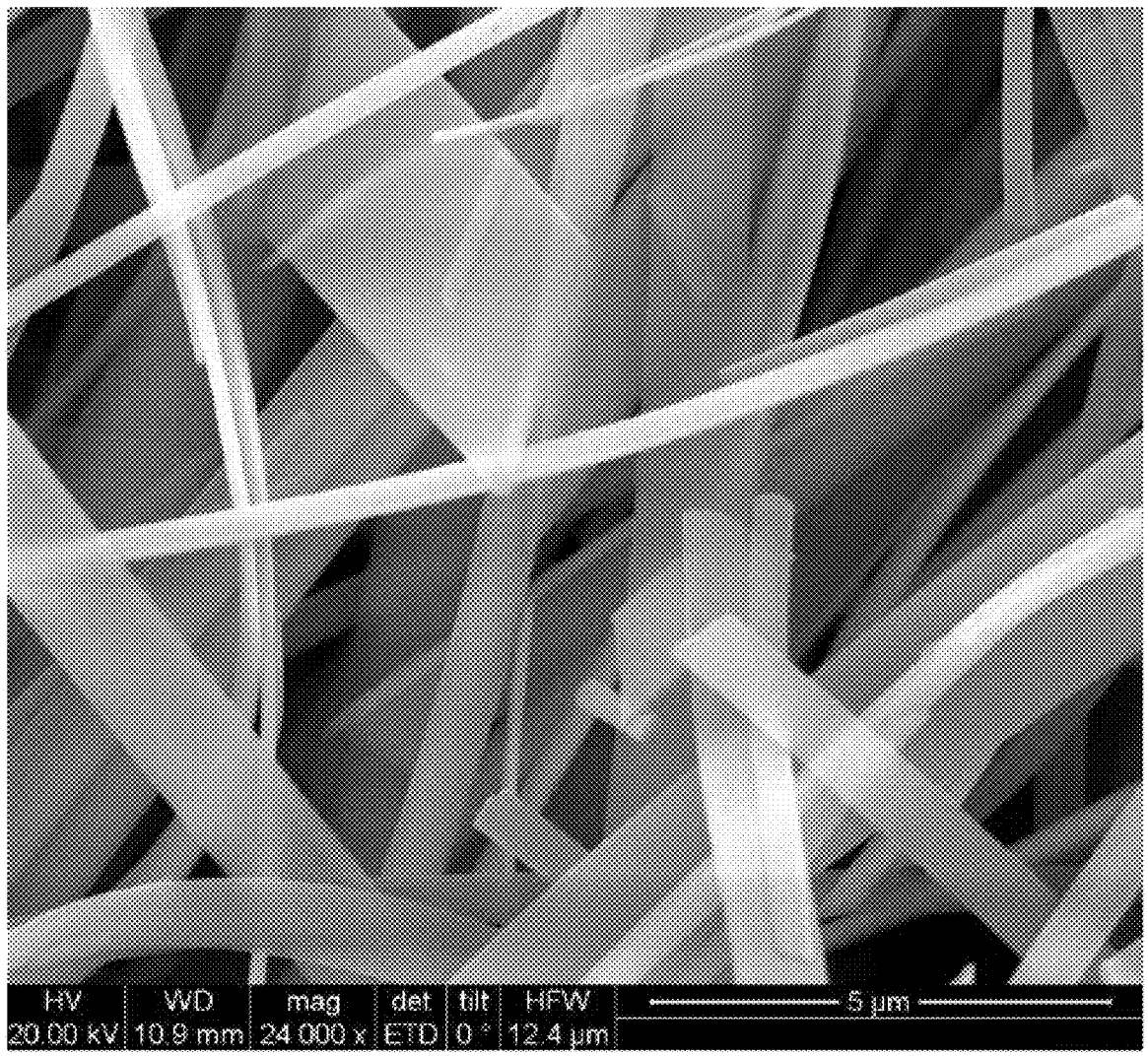
FIG. 6 is a scanning electron microscope (SEM) image of a boron nitride nanoribbon aerogel obtained in example 6 of the present application.

The SEM image of the boron nitride nanoribbon aerogel obtained in this example is shown in FIG. 6, and related physical property parameters are seen in Table 1.

Example 7

(a) 0.05 mol of boric acid and 0.01 mol of melamine were added into 100 mL of ethanol/tert-butanol mixed solution (a volume ratio of ethanol to tert-butanol was 1:10) and stirred in 70° C. water bath until the solution system was transparent.

(b) The transparent solution in step (a) was cooled for 90 min in 5° C. environment to obtain white boric acid/melamine salt hydrogel.

(c) The white boric acid/melamine salt hydrogel in step (b) was placed in a freeze drier to be freeze dried for 24 h to obtain boric acid/melamine salt aerogel.

(d) The boric acid/melamine salt aerogel in step (c) was subjected to high-temperature hydrolysis for 1 h at 800° C. in an argon/nitrogen atmosphere to obtain the flexible boron nitride nanoribbon aerogel.

Figure 7:
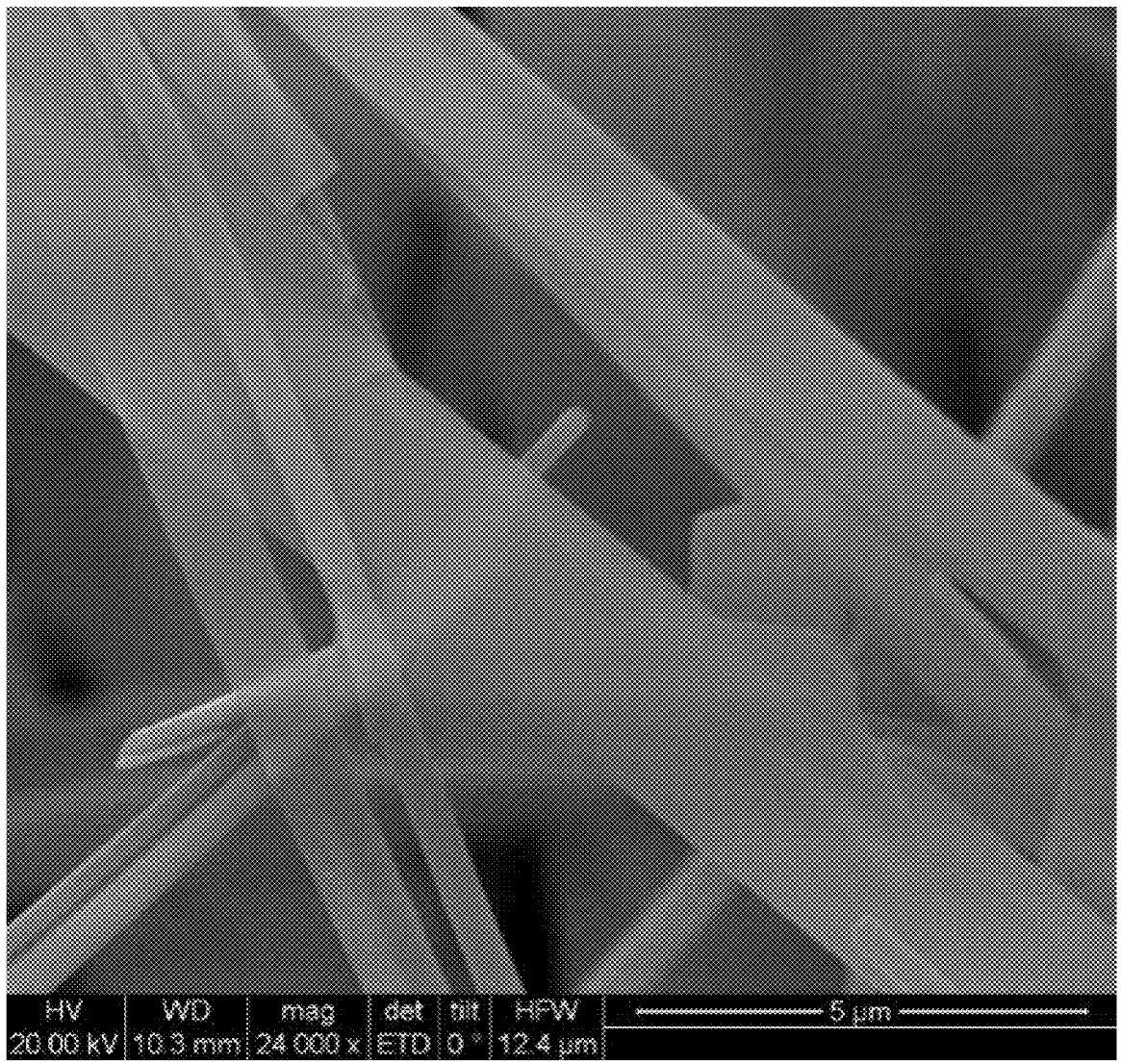
FIG. 7 is a scanning electron microscope (SEM) image of a boron nitride nanoribbon aerogel obtained in example 7 of the present application.

The SEM image of the boron nitride nanoribbon aerogel obtained in this example is shown in FIG. 7, and related physical property parameters are seen in Table 1.

Example 8

(a) 0.01 mol of boric acid and 0.03 mol of melamine were added into 100 mL of methanol solution and stirred in 85° C. water bath until the solution system was transparent.

(b) The transparent solution in step (a) was subjected to standing for 12 h in 65° C. environment to obtain white boric acid/melamine salt hydrogel.

(c) The white boric acid/melamine salt hydrogel in step (b) was placed in a freeze drier to be freeze dried for 24 h to obtain boric acid/melamine salt aerogel.

(d) The boric acid/melamine salt aerogel in step (c) was subjected to high-temperature hydrolysis for 12 h at 400° C. in an argon/nitrogen atmosphere to obtain the flexible boron nitride nanoribbon aerogel.

Figure 8:
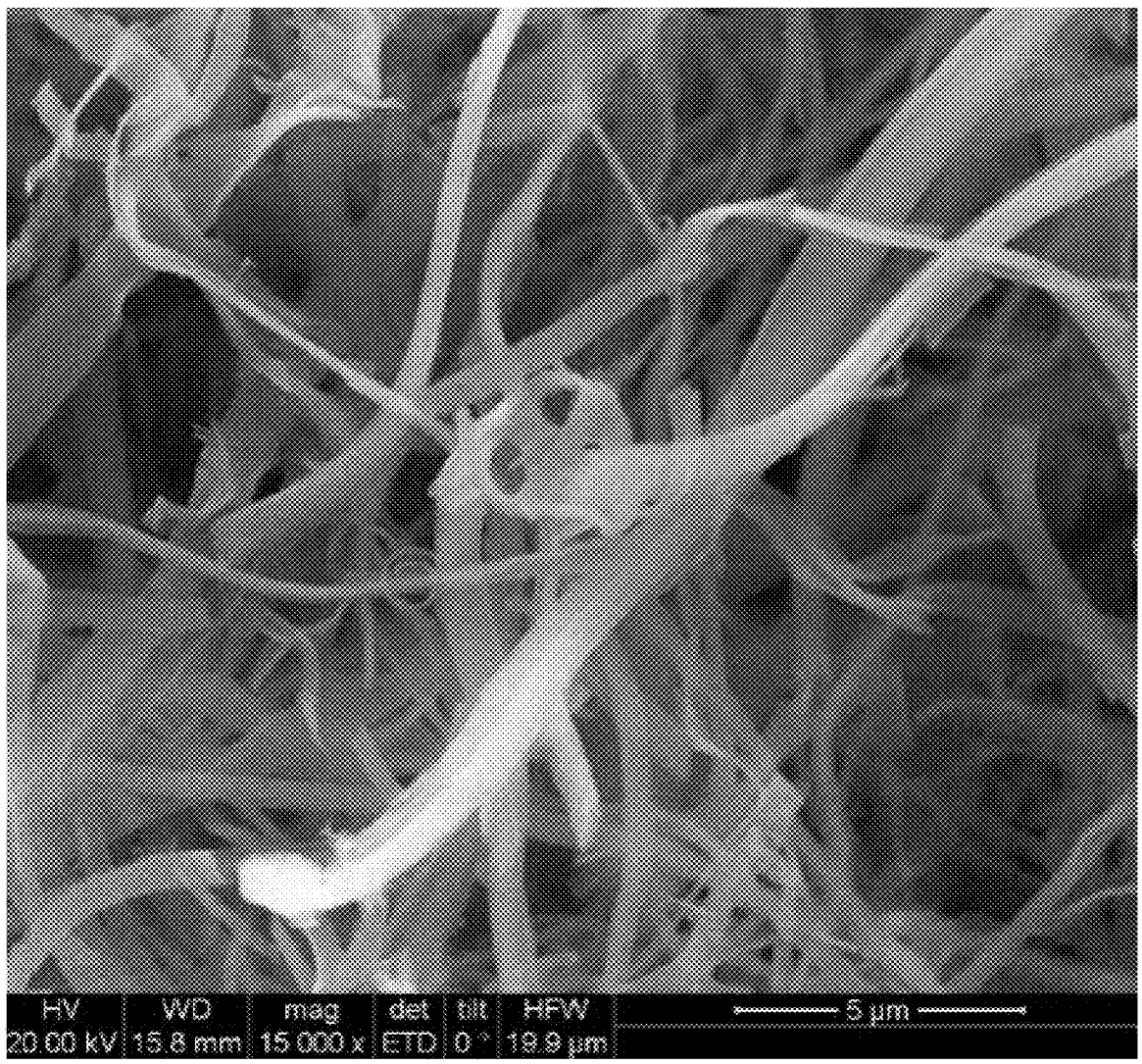
FIG. 8 is a scanning electron microscope (SEM) image of a boron nitride nanoribbon aerogel obtained in example 8 of the present application.

The SEM image of the boron nitride nanoribbon aerogel obtained in this example is shown in FIG. 8, and related physical property parameters are seen in Table 1.

Example 9

(a) 0.01 mol of boric acid and 0.5 mol of melamine were added into 100 mL of methanol solution and stirred in 30° C. water bath until the solution system was transparent.

(b) The transparent solution in step (a) was subjected to ultrasonic treatment for 0.5 min under the power of 200 W in a −50° C. environment to obtain white boric acid/melamine salt hydrogel.

(c) The white boric acid/melamine salt hydrogel in step (b) was placed in a freeze drier to be freeze dried for 24 h to obtain boric acid/melamine salt aerogel.

(d) The boric acid/melamine salt aerogel in step (c) was subjected to high-temperature hydrolysis for 10 h at 800° C. in an argon/nitrogen atmosphere to obtain the flexible boron nitride nanoribbon aerogel.

Figure 9:
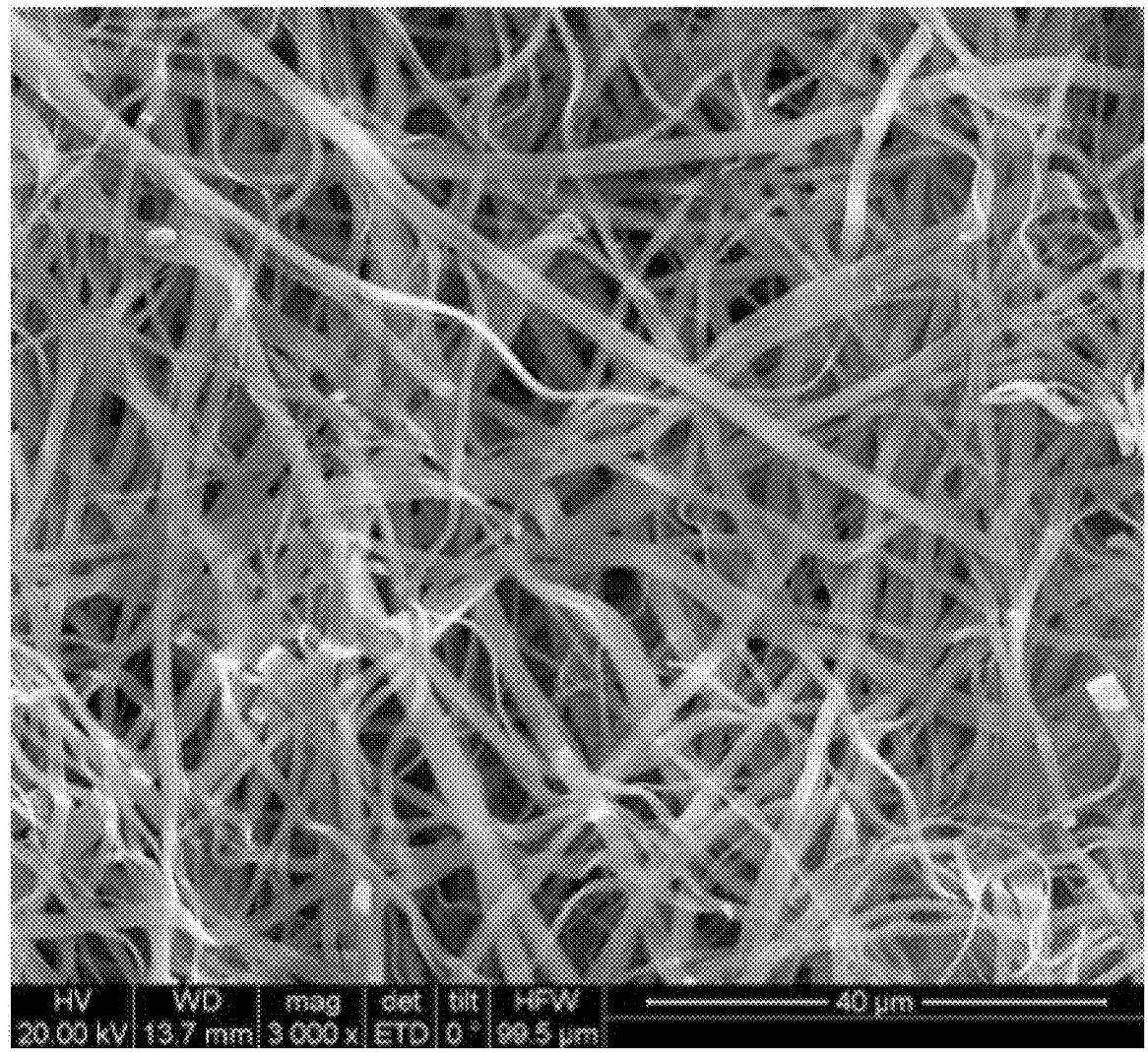
FIG. 9 is a scanning electron microscope (SEM) image of a boron nitride nanoribbon aerogel obtained in example 9 of the present application.

The SEM image of the boron nitride nanoribbon aerogel obtained in this example is shown in FIG. 9, and related physical property parameters are seen in Table 1.

Example 10

(a) 0.5 mol of boric acid, 0.01 mol of melamine and 0.01 mol of biuret were added into 300 mL of aqueous solution and stirred in 100° C. water bath until the solution system was transparent.

(b) The transparent solution in step (a) was subjected to standing for 8 h in a 40° C. environment to obtain white boric acid/melamine/biuret salt hydrogel.

(c) The white boric acid/melamine/biuret salt hydrogel in step (b) was placed in a freeze dryer to be freeze dried for 48 h to obtain boric acid/melamine/biuret salt aerogel.

(d) The boric acid/melamine/biuret salt aerogel in step (c) was subjected to high-temperature hydrolysis for 0.5 h at 1600° C. in a nitrogen atmosphere to obtain the flexible boron nitride nanoribbon aerogel.

Figure 10:
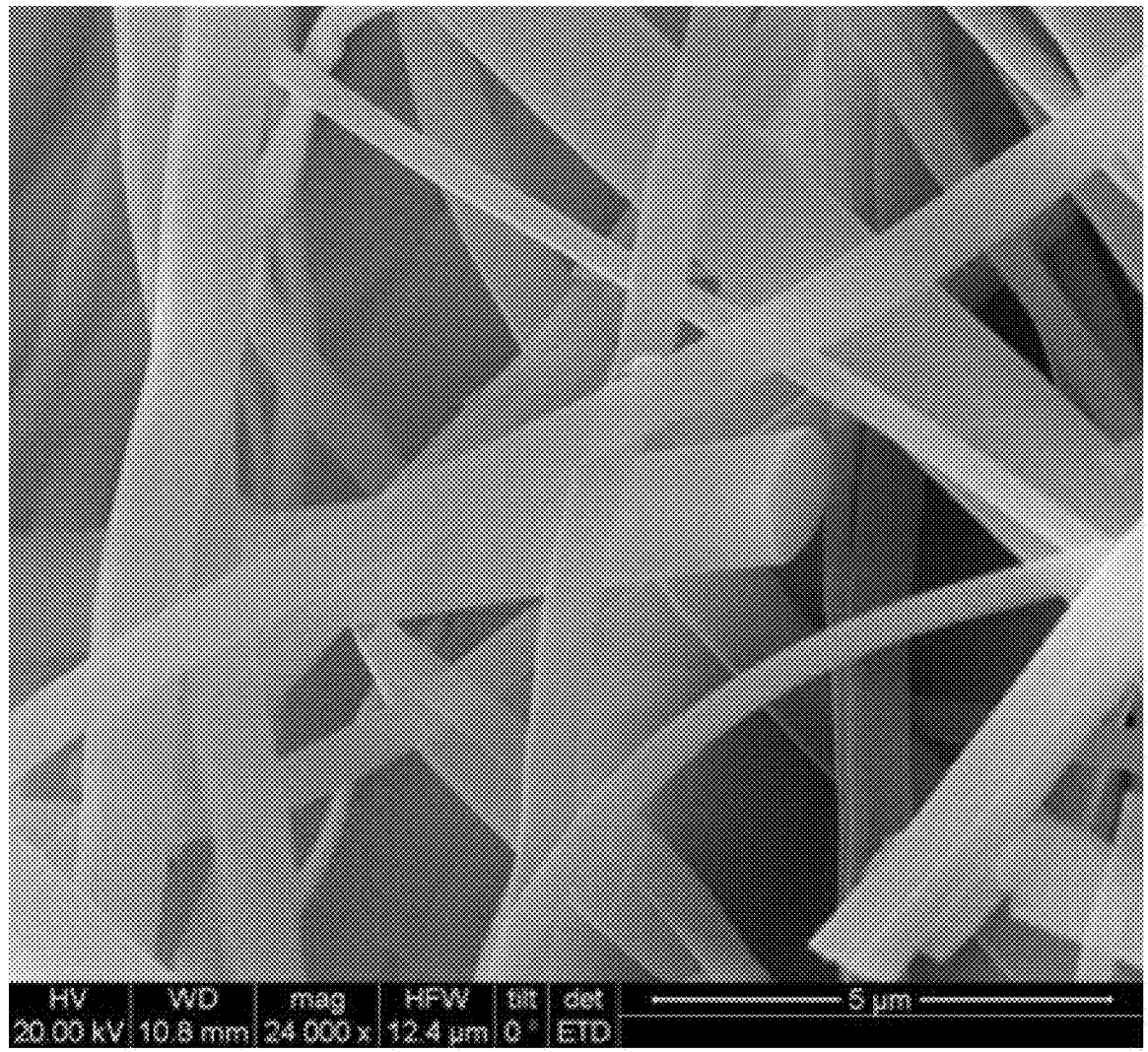
FIG. 10 is a scanning electron microscope (SEM) image of a boron nitride nanoribbon aerogel obtained in example 10 of the present application.

The SEM image of the boron nitride nanoribbon aerogel obtained in this example is shown in FIG. 10, and related physical property parameters are seen in Table 1.

TABLE 1

Various test property parameters of flexible boron nitride nanoribbon aerogel prepared in examples 1-10

| Example | Density (mg/cm$^3$) | Specific surface area (m$^2$/g) | Thermal conductivity (W/mK) | Contact angle (°) |
|---|---|---|---|---|
| 1 | 10 | 900 | 0.02 | 132 |
| 2 | 13 | 1000 | 0.034 | 120 |
| 3 | 16 | 608 | 0.023 | 86 |
| 4 | 12 | 709 | 0.041 | 153 |
| 5 | 11 | 377 | 0.028 | 78 |
| 6 | 5 | 289 | 0.0376 | 165 |
| 7 | 3 | 667 | 0.7 | 156 |
| 8 | 7 | 1232 | 1.6 | 54 |
| 9 | 20 | 1300 | 0.1 | 120 |
| 10 | 50 | 620 | 0.5 | 135 |

In addition, the present inventors also prepare a series of flexible boron nitrogen nanoribbon aerogels by using other raw materials and process conditions listed in this specification and referring to methods in examples 1-10. It is found by test that these flexible boron nitrogen nanoribbon aerogels have various excellent properties described in this specification.

Through the above examples, it can be proved that the flexible boron nitride nanoribbon aerogel of the present application has excellent property, excellent flexibility and resilience and the required preparation equipment is simple to operate and can realize continuous and automatic production, thereby greatly shortening the preparation cycle and cost. The flexible boron nitride nanoribbon aerogel has great application prospects.

It should be understood that the above description are only some embodiments of the present application. It should be noted that, for persons of ordinary skill in the art, other deformations and improvements can also be made without creative concepts of the present application, which are all included within the protective scope of the present application.

What is claimed is:

1. A flexible boron nitride nanoribbon aerogel, comprising an interconnected three-dimensional porous network structure, wherein the interconnected three-dimensional porous network structure is formed by mutually twining and contacting boron nitride nanoribbons and consists of macropores having a pore diameter of more than 50 nm, mesopores having a pore diameter of 2-50 nm and micropores having a pore diameter of less than 2 nm and wherein the boron nitride nanoribbons have a thickness of 1 nm-100 nm and a width of 200 nm-10 μm.

2. The flexible boron nitride nanoribbon aerogel according to claim 1, wherein the macropores are formed by interconnecting the boron nitride nanoribbons, and each of the boron nitride nanoribbons has the mesopores and the micropores; and/or each of the boron nitride nanoribbons is in a straight, twisted or bent state in the interconnected three-dimensional porous network structure.

3. The flexible boron nitride nanoribbon aerogel according to claim 1, wherein each of the boron nitride nanoribbons is mainly composed of boron and nitrogen; each of the boron nitride nanoribbons comprises the boron, the nitrogen, carbon and oxygen.

4. The flexible boron nitride nanoribbon aerogel according to claim 1, wherein the flexible boron nitride nanoribbon aerogel has a density of 1-600 mg/ml; and/or a contact angle between a surface of the flexible boron nitride nanoribbon aerogel and water is 60-170°; and/or the flexible boron nitride nanoribbon aerogel has a thermal conductivity of 0.025-0.5 W/mK; and/or the flexible boron nitride nanoribbon aerogel has a specific surface area of 10-1800 m$^2$/g, a pore volume of 0.1-2.0 cm$^3$/g, and a porosity of 1-99%.

5. The flexible boron nitride nanoribbon aerogel according to claim 1, wherein the flexible boron nitride nanoribbon aerogel withstands a selected form of load without breaking and is restored to an original shape when the selected form of load is removed; wherein the selected form of load is selected from the group consisting of external compression, bending, twisting and shearing; wherein the flexible boron nitride nanoribbon aerogel has a flexibility and resilience at a temperature within a temperature range of −196-1000° C.

6. A preparation method of the flexible boron nitride nanoribbon aerogel of claim 1, comprising:
  1) dissolving boric acid and a nitrogen-containing precursor into a solvent to obtain a transparent precursor solution;
  2) cooling the transparent precursor solution to obtain a precursor hydrogel;
  3) drying the precursor hydrogel to obtain a precursor aerogel; and
  4) performing a high-temperature hydrolysis on the precursor aerogel in a protective atmosphere to obtain the flexible boron nitride nanoribbon aerogel.

7. The preparation method according to claim 6, wherein the nitrogen-containing precursor in step 1) comprises at least one selected from the group consisting of urea, melamine, cyanuric acid, biuret and dimethylguanidine; and/or a molar ratio of the boric acid to the nitrogen-containing precursor is (1:50) -(50:1); and/or the solvent comprises at least one selected from the group consisting of water, methanol, ethanol, ethylene glycol, n-propanol, isopropanol, n-butanol, isobutanol, sec-butanol, tert-butanol, acetone and dimethyl sulfoxide; and/or a dissolution temperature is 30-100° C.

8. The preparation method according to claim 6, wherein in step 2), a cooling temperature is −196-65° C., and a cooling time is 5 min-12 h, and the cooling is performed in an ultrasonic environment or an ultrasonic-free environment; wherein an ultrasonic power is 0.01 W-10000 W, and an ultrasonic time is 0.5 min-12 h; and/or
  the drying in step 3) comprises at least one selected from the group consisting of freeze drying, ambient drying, vacuum drying and supercritical drying.

9. The preparation method according to claim 6, wherein in step 4), a high-temperature hydrolysis temperature is 400-1800° C., and a high-temperature hydrolysis time is 0.5-24 h; and/or the protective atmosphere comprises at least one selected from the group consisting of an nitrogen atmosphere, an inert gas atmosphere, an ammonia atmosphere, a hydrogen atmosphere and an air atmosphere.

10. The flexible boron nitride nanoribbon aerogel according to claim 2, wherein the flexible boron nitride nanoribbon aerogel withstands a selected form of load without breaking and is restored to an original shape when the selected form of load is removed; wherein the selected form of load is selected from the group consisting of external compression, bending, twisting and shearing; wherein the flexible boron nitride nanoribbon aerogel has a flexibility and resilience at a temperature within a temperature range of −196-1000° C.

11. The flexible boron nitride nanoribbon aerogel according to claim 3, wherein the flexible boron nitride nanoribbon aerogel withstands a selected form of load without breaking and is restored to an original shape when the selected form of load is removed; wherein the selected form of load is selected from the group consisting of external compression, bending, twisting and shearing; wherein the flexible boron nitride nanoribbon aerogel has a flexibility and resilience at a temperature within a temperature range of −196-1000° C.

12. The flexible boron nitride nanoribbon aerogel according to claim 4, wherein the flexible boron nitride nanoribbon aerogel withstands a selected form of load without breaking and is restored to an original shape when the selected form of load is removed; wherein the selected form of load is selected from the group consisting of external compression, bending, twisting and shearing; wherein the flexible boron nitride nanoribbon aerogel has a flexibility and resilience at a temperature within a temperature range of −196-1000° C.

13. The flexible boron nitride nanoribbon aerogel according to claim 1, wherein the boron nitride nanoribbons are in a twisted state in the three-dimensional porous network structure.

14. The flexible boron nitride nanoribbon aerogel according to claim 1, wherein the boron nitride nanoribbons are in a twisted state in the three-dimensional porous network structure, the flexible boron nitride nanoribbon aerogel has a density of 5-100 mg/mL; a contact angle between a surface of the flexible boron nitride nanoribbon aerogel and water is 120-150°; the flexible boron nitride nanoribbon aerogel has a thermal conductivity of 0.03-0.05 W/mK; the flexible boron nitride nanoribbon aerogel has a specific surface area of 500-1500 m$^2$/g, a pore volume of 0.5-1.5 cm$^3$/g, and a porosity of 75-97%.

* * * * *